United States Patent
Lambeth et al.

(10) Patent No.: US 7,076,634 B2
(45) Date of Patent: Jul. 11, 2006

(54) ADDRESS TRANSLATION MANAGER AND METHOD FOR A LOGICALLY PARTITIONED COMPUTER SYSTEM

(75) Inventors: Shawn Michael Lambeth, Pine Island, MN (US); Travis James Pizel, Rochester, MN (US); Thomas Rembert Sand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 10/422,214

(22) Filed: Apr. 24, 2003

(65) Prior Publication Data

US 2004/0215917 A1    Oct. 28, 2004

(51) Int. Cl.
*G06F 12/10* (2006.01)
(52) U.S. Cl. .................. 711/206; 711/208; 711/209
(58) Field of Classification Search ........... 711/203, 711/206, 209
See application file for complete search history.

(56) References Cited

U.S. PATENT DOCUMENTS 5,745,789 A * 4/1998 Kakuta .................. 710/21
6,725,284 B1 * 4/2004 Arndt ...................... 710/5

* cited by examiner

*Primary Examiner*—Donald Sparks
*Assistant Examiner*—Jesse Diller
(74) *Attorney, Agent, or Firm*—Martin & Associates, LLC; Derek P. Martin; Bret J. Petersen (57) ABSTRACT

An address translation manager creates a set of chained tables that may be allocated in non-contiguous physical memory, and that may be dynamically resized as needed. The chained tables comprise one or more tables that each correspond to a logical partition, with each table including a pointer to a table corresponding to a virtual connection in the logical partition. The chained tables are managed by the address translation manager, which uses the system memory manager to dynamically allocate and free memory for a chained table as needed.

22 Claims, 5 Drawing Sheets

ADDRESS TRANSLATION MANAGER AND METHOD FOR A LOGICALLY PARTITIONED COMPUTER SYSTEM

BACKGROUND OF THE INVENTION

1. Technical Field

This invention generally relates to data processing, and more specifically relates to communication between logical partitions in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure they can share needed resources in the computer system while maintaining the separate computing environments defined by the logical partitions.

A computer system that includes multiple logical partitions typically shares resources between the logical partitions. For example, a computer system with two logical partitions and a single CPU could be defined that allocates 50% of the CPU to each partition, that allocates 33% of the memory to the first partition and 67% of the memory to the second partition, and that allocates two different I/O slots to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Logically partitioned computer systems have recognized that input/output (I/O) devices may be shared between logical partitions. This led to the concept of a virtual I/O device. For example, let's assume a computer system with two logical partitions includes a single network adapter card. The first partition could be assigned a first virtual network connection that uses the physical network adapter card. The second partition could then be assigned a second virtual network connection that also uses the same physical network adapter card. Because multiple logical partitions now have simultaneous access to a physical device, the logical partitions must have the capability of moving data between the partitions, because a read from the physical network adapter card by one logical partition may read data that is intended for the other logical partition. In addition, one or more virtual connections may be defined that allow direct communication between logical partitions.

To move data between logical partitions, there must be some memory management mechanism that translates the address in one partition's memory space to a corresponding physical address in memory that is accessible by a different partition. This address translation has been performed in prior art IBM iSeries computer systems using translation control entities, or TCEs, which provide translation of I/O addresses to physical real addresses, and which provide access control characteristics for the physical storage. A partition manager allocates large, fixed, contiguous blocks of protected memory for the TCEs, which are used to translate an address in a logical partition's memory space to the corresponding physical address in memory. These large blocks of contiguous memory are allocated before the memory manager is running, and are allocated in protected memory accessible only by the partition manager. As the number of virtual connections increases, the number of TCEs correspondingly increases, resulting in memory capacity problems caused by the prior art method of allocating TCEs. Without a way to improve how TCEs are allocated in a logically partitioned computer system, the computer industry will continue to suffer from inefficient mechanisms and methods for performing address translation in logically partitioned computer systems.

DISCLOSURE OF INVENTION

An address translation manager of the preferred embodiments creates a set of chained tables that may be allocated in non-contiguous physical memory, and that may be dynamically resized as needed. The chained tables comprise one or more tables that each correspond to a logical partition, with each table including a pointer to a table corresponding to a virtual connection in the logical partition. The chained tables are managed by the address translation manager, which uses the system memory manager to dynamically allocate and free memory for a chained table as needed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1. Overview

Figure 2:
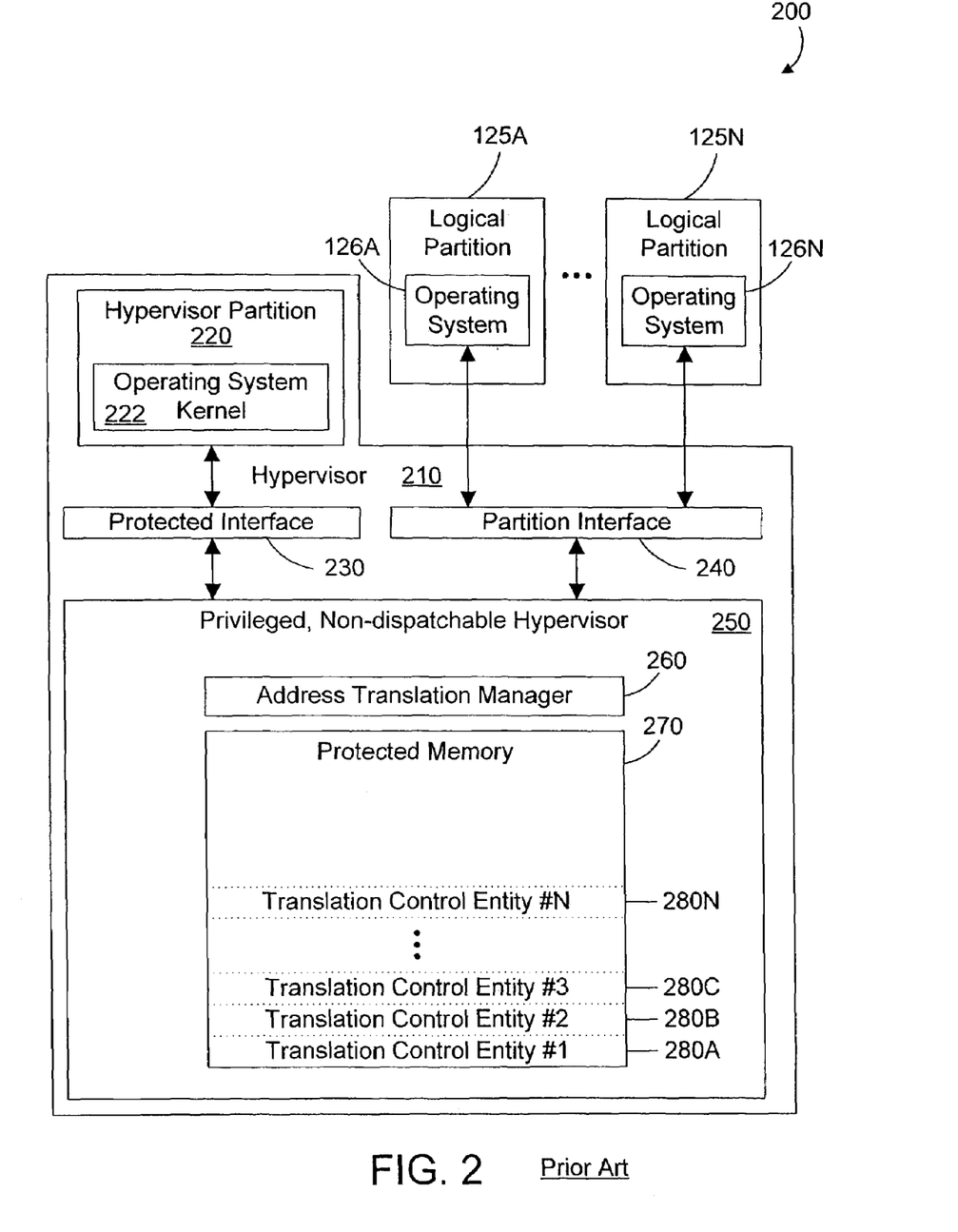
FIG. 2 is a block diagram of a prior art system for address translation in a logically partitioned computer system.

The prior art provides a way for translating addresses in a logical partition to a corresponding address in memory. One sample of a prior art system 200 is shown in FIG. 2. Prior art system 200 preferably includes a partition manager 210 (called a "hypervisor" in IBM terminology) that manages logical partitions 125 that execute their corresponding operating systems 126. In FIG. 2, logical partitions 125A through 125N are shown. These logical partitions communicate with the hypervisor 210 via a partition interface 240, which provides access to services located in the privileged, non-dispatchable hypervisor 250.

Within the hypervisor 210 is a hypervisor partition 220 with its own operating system kernel 222. The hypervisor partition 220 communicates with the privileged non-dispatchable hypervisor 250 via a protected interface 230. The privileged, non-dispatchable hypervisor 250 includes an address translation manager 260 that allocates a plurality of translation control entities 280 within relatively large, contiguous blocks of protected memory 270. In FIG. 2, the translation control entities are shown as 280A through 280N. The size of the blocks allocated for translation control entities 280 are typically fixed and relatively large because this enables large areas of storage to be mapped via translation control entities at any one time. Mapping large areas is one way to improve system performance. In prior art system 200, the address translation manager 260 allocates the translation control entities 280 before the system memory manager in the hypervisor is running, which means that the translation control entities 280 cannot be controlled by the system memory manager. Because a number of translation control entities 280 are generally required for each virtual connection, as the number of virtual connections increases, the hypervisor 210 may run out of protected memory 270 using the prior art scheme illustrated in FIG. 2.

2. Description of the Preferred Embodiments

To overcome the limitations of prior art system 200 in FIG. 2, it is desirable to dynamically construct and resize an address translation table as required, to allocate portions of the address translation tables in non-contiguous portions of memory, and to allow the system memory manager to manage the allocation of memory to and from the translation control tables. These are advantages provided by the preferred embodiments. An address translation manager constructs chained tables to manage translation control entities, which perform address translation between addresses in a logical partition and corresponding physical addresses in memory. The chained tables are created after the system memory manager is running, which allows the memory allocated to a chained table to be managed by the system memory manager, and thus to be reclaimed by the system memory manager when the chained table (or portion of the chained table) is no longer needed. By connecting tables together to form a chained table, large contiguous blocks of protected memory are no longer required. Much smaller blocks may be used because the chained tables may be dynamically resized by the address translation manager on-demand as required. These smaller blocks may be located in non-contiguous portions of memory.

Figure 1:
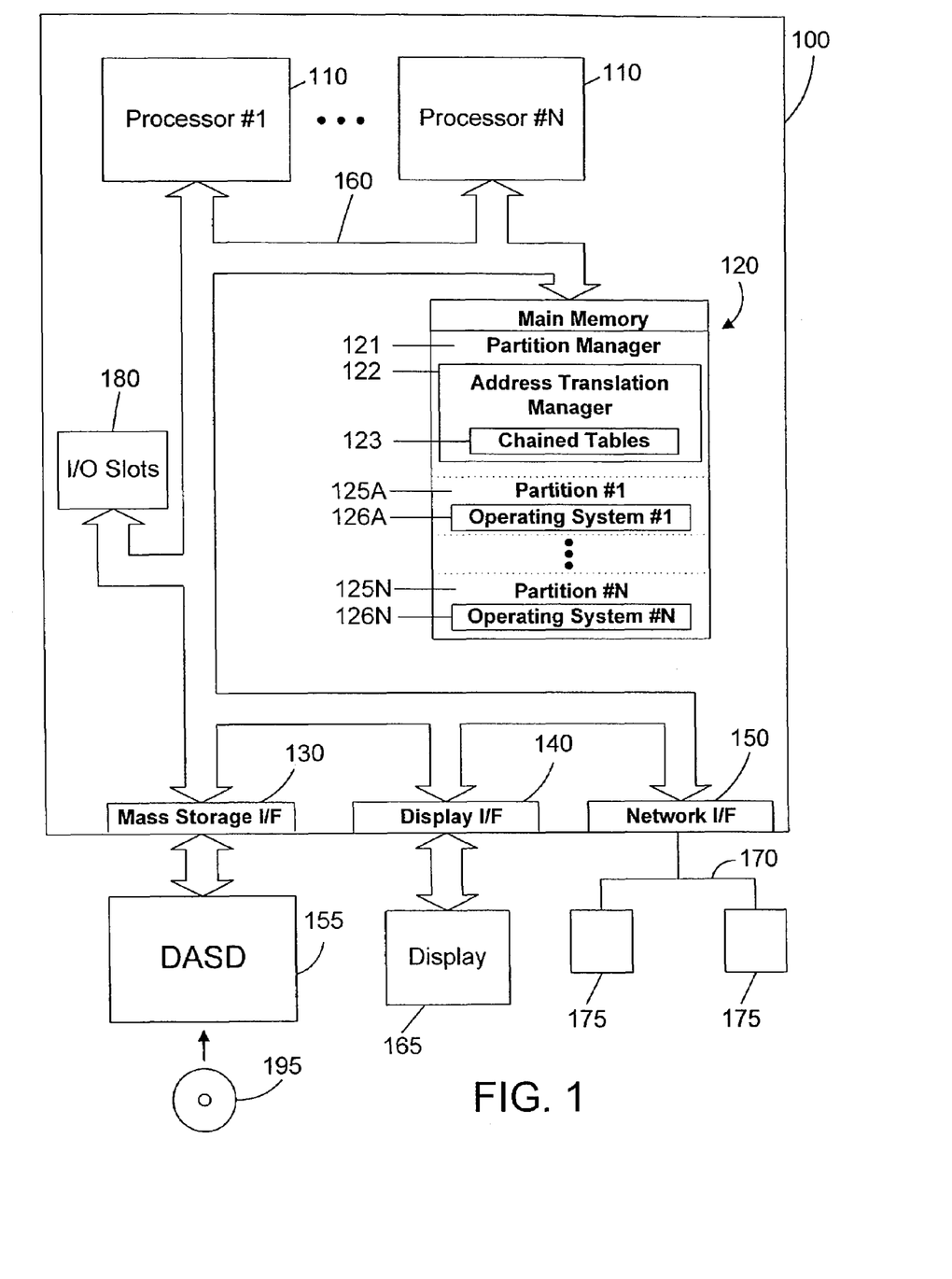
FIG. 1 is a block diagram of a computer apparatus that supports logical partitioning and address translation in accordance with the preferred embodiments.

Referring to FIG. 1, a computer system 100 is an enhanced IBM eServer iSeries computer system, and represents one suitable type of computer system that supports logical partitioning and address translation in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180.

Main memory 120 contains a partition manager 121 and N logical partitions 125, shown in FIG. 1 as logical partitions 125A through 125N. Partition manager 121 preferably creates these N logical partitions 125. Each logical partition preferably includes a corresponding operating system 126, shown in FIG. 1 as operating systems 126A through 126N.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partition manager 121 preferably includes an address translation manager 122 that constructs and manages one or more chained tables 123. These chained tables 123 provide significant advantages over the fixed, contiguous blocks of memory used in the prior art. First, the memory for the chained tables 123 is preferably managed by a memory manager, thereby allowing the dynamic resizing of a chained table 123 as required. Furthermore, the chained tables 123 are typically much smaller than a contiguous block of protected memory used in the prior art. In the prior art, contiguous storage was reserved and never returned to the system memory manager. Chained tables have the capability to grow and shrink in relatively small increments, therefore using less overall storage. And finally, the chained tables 123 may be located in non-contiguous memory. Of course, other advantages are also within the scope of the preferred embodiments. Some of these advantages will be appreciated from the discussion below.

The partitions 125A–125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180. Thus, one partition could be defined to include two processors and a portion of memory 120, along with one or more I/O processors and/or slots that can provide the functions of mass storage interface 130, display interface 140, network interface 150, or interfaces to I/O devices plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121 preferably resides in memory and hardware separate from the partitions and include facilities and mechanisms that are not directly available to the partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A–125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

FIG. 1 shows a sample computer system that includes some of the salient features of both hardware and software in accordance with the preferred embodiments. A more detailed logical view of some of the components in FIG. 1 is shown as system 300 in FIG. 3. In system 300, N logical partitions 125A–125N are shown executing their respective operating systems 126A–126N. A hypervisor 310 is shown as one particular implementation of partition manager 121 in FIG. 1. Hypervisor 310 includes a hypervisor partition 320 that runs an operating system kernel 322. The operating system kernel 322 is dispatchable and relocatable, and provides typical functions of operating system kernels, such as multitasking and memory management. The hypervisor partition 320 executes much as other logical partitions but differs from other logical partitions in that it is something of a private, or hidden, partition that does not provide for user applications and that has special authorities to control platform resources and is the only partition authorized to communicate with non-dispatchable hypervisor 350 via the protected interface 330. The hypervisor partition 320 in FIG. 3 may correspond to a partition 125 in FIG. 1, which means the operating system kernel 322 also corresponds to an operating system 126 in FIG. 1. The protected interface 330 is used by the hypervisor partition 310 to invoke hypervisor functions performed by the privileged, non-dispatchable hypervisor 350.

Figure 3:
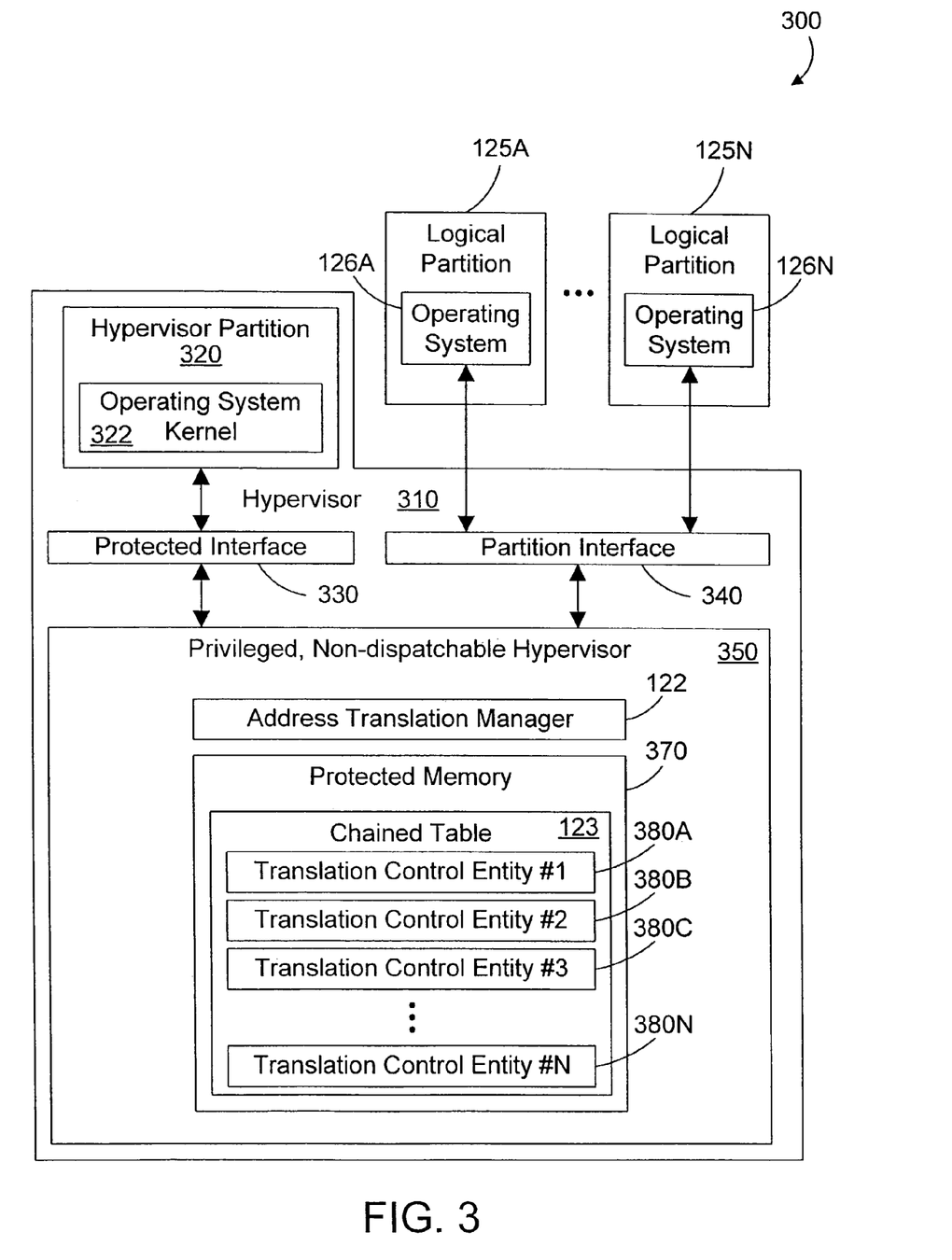
FIG. 3 is a block diagram of a system for address translation in a logically partitioned computer system in accordance with the preferred embodiments.

The logical partitions 125 communicate with the hypervisor 310 via partition interface 340, which is used by logical partitions to invoke privileged, non-dispatchable hypervisor 350. The non-dispatchable hypervisor 350 is a supervisory agent that is non-dispatchable and non-relocatable; it functions by accessing physical addresses. The non-dispatchable hypervisor 350 provides privilege mode functions that are invoked through any of: 1) the protected interface 330 while the hypervisor partition 320 is scheduling or dispatching logical partition execution; 2) through platform hardware interrupts; and 3) from a logical partition 125 using processor supervisory-call instructions defined by the partition interface 340 that place the logical partition execution thread into a hypervisor execution (i.e., privileged) mode.

The privileged, non-dispatchable hypervisor 350 preferably includes an address translation manager 122 of the preferred embodiments, which performs management of the address translation control entities using one or more chained tables 123 within protected memory 370. Each chained table 123 may include one or more translation control entities 380, as shown in FIG. 3 by 380A–380N. The translation control entities 380 preferably perform the same function as prior art translation control entities 280 in FIG. 2. Note, however, that it is within the scope of the preferred embodiments for translation control entities 380 to also perform different or additional functions when compared to prior art translation control entities 280. Instead of allocating large, contiguous blocks of protected memory to the translation control entities, the address translation manager 122 of the preferred embodiments allows dynamically building and resizing one or more chained tables 123 on-demand to access the appropriate translation control entity as required. This allows more efficient use of protected memory 370. In addition, this scheme waits until a system memory manager is running and allows address translation manager 122 to create the chained tables 123 from protected memory 370 under control of the system memory manager, thereby allowing the system memory manager to reclaim portions of chained tables 123 that are no longer needed, and to manage portions that are added to chained tables 123 as required.

Figure 4:
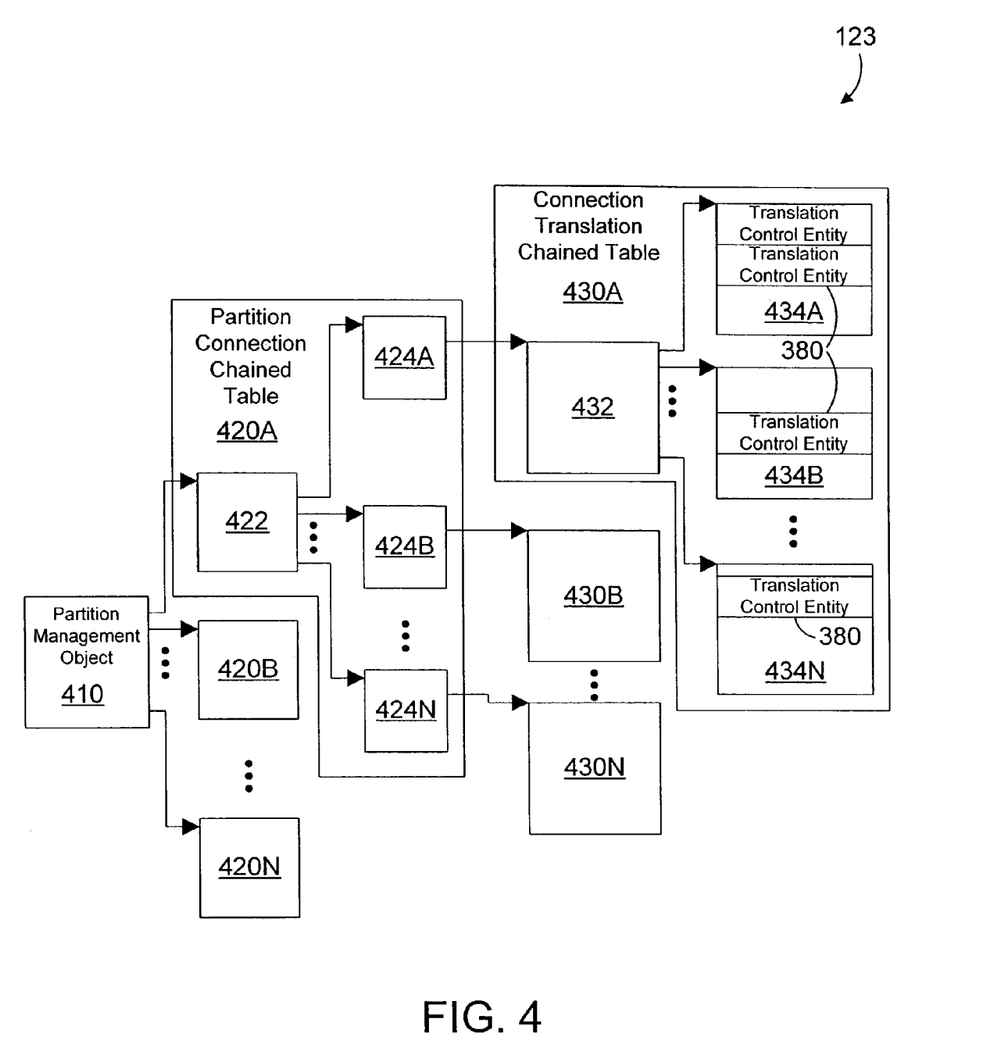
FIG. 4 is a block diagram of a sample chained table in accordance with the preferred embodiments.

One suitable example of a chained table 123 in accordance with the preferred embodiments is shown in FIG. 4. We assume for this particular example that all translation control entities are accessed via a single partition management object 410. The partition management object 410 includes pointers to partition connection chained tables 420, shown in FIG. 4 as 420A, 420B, . . . , 420N. Each partition connection chained table 420 contains one or more pointers to connection translation chained tables 430, shown in FIG. 4 as 430A, 430B, . . . , 430N. The details within a partition connection chained table 420 are shown in 420A in FIG. 4. The partition management object 410 contains a pointer to a first level table 422, which contains pointers to second level tables 424, shown in FIG. 4 as 424A, 424B, . . . , 424N. In the most preferred implementation, there is a single partition connection chained table 420 for each logical partition that establishes a virtual connection. The second level tables 424 each contain pointers to a corresponding connection translation chained table 430. Thus, table 424A is shown to contain a pointer to connection translation chained table 430A in FIG. 4. Details within a connection translation chained table 430 are shown in 430A in FIG. 4. Connection translation chained table 430A preferably includes a first level table 432 that contains one or more pointers to second level tables 434, shown in FIG. 4 as 434A, 434B, . . . , 434N. Each second level table 434 preferably includes one or more translation control entities 380, as shown in FIG. 4. These translation control entities 380 are the items that actually perform the address translation and access control for an address in a logical partition and a corresponding address in memory. The preferred embodiments simply provide a different way to allocate memory for the translation control entities 380 and a different way of accessing these translation control entities 380. Note also that the chained tables 123 provide a logical hierarchy of pointers. Each logical partition with a virtual connection has a corresponding partition connection chained table 420. Each virtual connection has a corresponding connection translation chained table 430. The chained configuration of these tables makes it possible to search the tables very quickly, even though the memory for these tables may be distributed in non-contiguous portions of memory.

The chained tables 123 may be dynamically resized as required by the address translation manager 122. For example, let's assume for the chained table 123 depicted in FIG. 4 that the first level table 422 is full, which means that all of its memory locations are filled with pointers to second level tables 424. Let's further assume that each second level table 424 is full. Now let's assume that one more virtual connection needs to be added to the logical partition corresponding to the partition connection chained table 420A. This means that one more pointer in the second level tables 424 needs to be created to point to a connection translation chained table 430 that is created for the new virtual connection. Note, however, that there is no more room in the second level tables 424 for a new pointer and there is likewise no more room in the first level table 422. In response, the address translation manager 122 creates new tables 421, 423, and 425 shown in FIG. 5, changes the pointer in the partition management object 410 to point to the new table 421, and adds pointers to tables 422 and 423 to the new table 421. A pointer is also created in new table 423 that points to new table 425. Note that table 425 preferably includes a pointer to a new connection translation table 430Z that corresponds to the newly added connection. In this manner the address translation manager 122 may dynamically increase the size of a chained table 123 as required. In similar fashion, if a connection is destroyed, or if a logical partition is shut down, memory in the corresponding chained tables may be reclaimed by the address translation manager 122 and returned to a system memory manager. In this manner, the address translation manager 122 uses one or more sets of chained tables to access a translation control entity that will be used to perform the required address translation.

Figure 5:
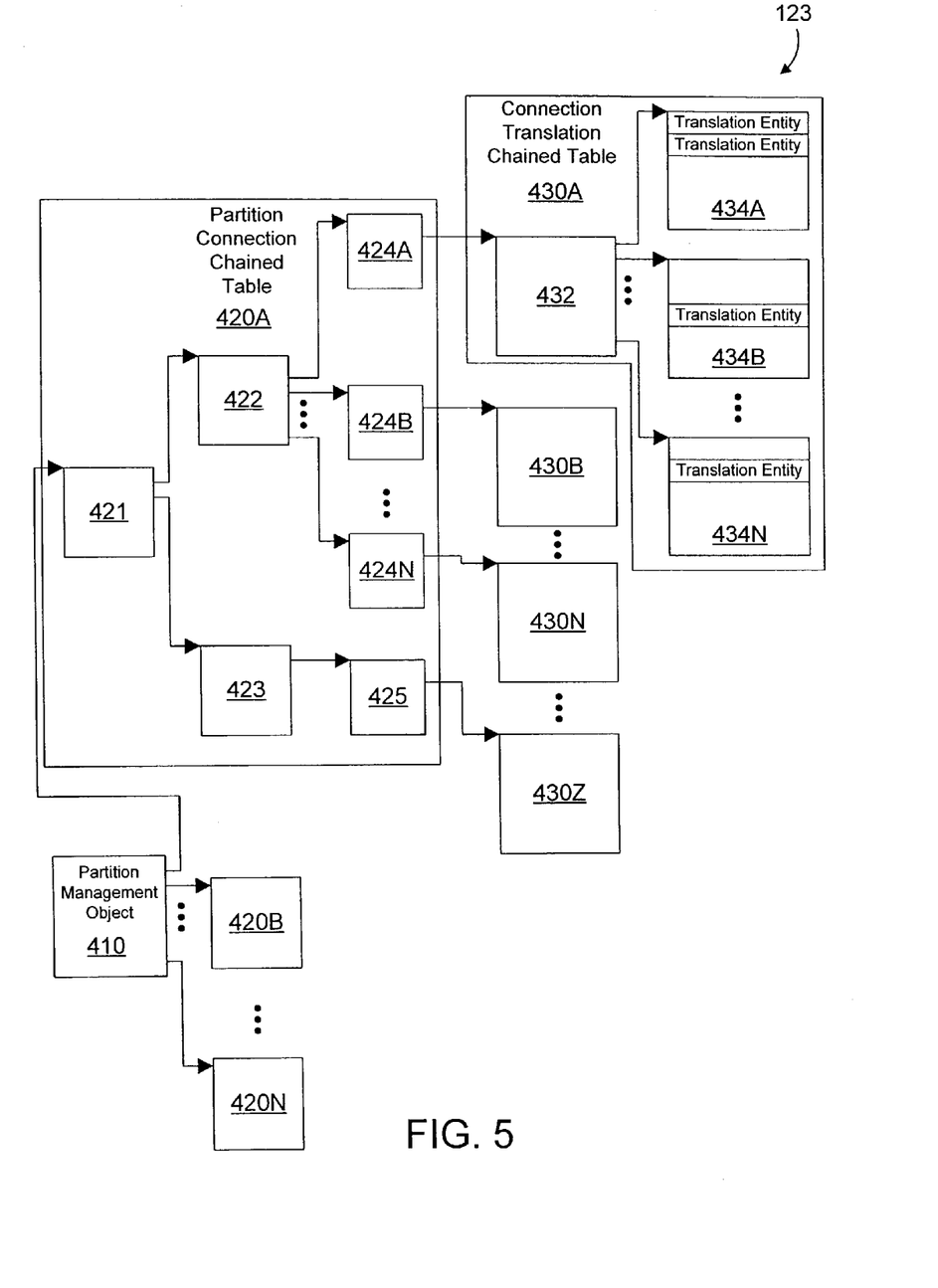
FIG. 5 is a block diagram of the sample chained table in FIG. 4 after adding elements 421, 423 and 425.

The partition connection chained table 420A in FIG. 4 is shown to have two levels of chained tables, while the connection chained table 420A in FIG. 5 is shown with three levels of chained tables. The specific examples in FIGS. 4 and 5 are illustrative of specific implementations in accordance with the preferred embodiments, and should not be construed as limiting. The preferred embodiments expressly extend to using any suitable number of levels of tables in the partition connection chained tables 420 and in the connection translation chained tables 430, from one to any suitable number of levels.

The preferred embodiments provides significant advantages over the prior art. First, large, contiguous blocks of protected memory are no longer required. Second, the memory allocated to translation control entities may now be managed by a system memory manager. And third, the chained tables allow for dynamically resizing the table as system requirements change. These advantages provide great power and flexibility, especially in a realm where the number of logical connections continues to rapidly increase.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a plurality of logical partitions defined on the apparatus; and
   an address translation manager that uses an address translation table to translate an address in one of the plurality of logical partitions to a corresponding physical address in the memory, the address translation table comprising a first chained table corresponding to one of the plurality of logical partitions, the first table containing a pointer to a second table corresponding to a virtual connection in the one logical partition.

2. The apparatus of claim 1 wherein the second table comprises a chained table.

3. The apparatus of claim 1 wherein the first and second tables are located in non-contiguous portions of the memory.

4. The apparatus of claim 1 wherein the address translation manager creates the first and second tables in the memory.

5. The apparatus of claim 1 wherein the address translation manager dynamically changes the size of the address translation table.

6. The apparatus of claim 1 wherein the address translation table comprises:
a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory.

7. An apparatus comprising:
at least one processor;
a memory coupled to the at least one processor;
a plurality of logical partitions defined on the apparatus;
an address translation manager that uses an address translation table to translate an address in one of the plurality of logical partitions to a corresponding physical address in the memory, the address translation table comprising a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory, wherein the address translation manager dynamically changes the size of the address translation table; and
a memory manager that allocates at least one portion of the memory for the address translation table.

8. A computer-implemented method for translating an address in a logical partition to a corresponding physical address in memory, the method comprising the steps of:
constructing an address translation table, the address translation table comprising a first chained table corresponding to the logical partition, the first table containing a pointer to a second table corresponding to a virtual connection in the logical partition;
reading from the first table the pointer to the second table; and
accessing at least one item in the second table to translate the address to the corresponding physical address in memory.

9. The method of claim 8 wherein the at least one item comprises at least one translation control entity.

10. The method of claim 8 wherein the second table comprises a chained table.

11. The method of claim 8 wherein the first and second tables are located in non-contiguous portions of the memory.

12. The method of claim 8 further comprising the step of creating the first and second tables in the memory.

13. The method of claim 8 further comprising the step of dynamically changing the size of the address translation table.

14. The method of claim 8 wherein the address translation table comprises:

a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory.

15. A computer-implemented method for translating an address in a logical partition to a corresponding physical address in memory, the method comprising the steps of:
constructing an address translation table, the address translation table comprising a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory;
reading from the partition connection chained table a pointer to the connection translation chained table; and
accessing at least one translation control entity in the connection translation chained table to translate the address to the corresponding physical address in memory.

16. A program product comprising:
an address translation manager that uses an address translation table to translate an address in one of a plurality of logical partitions to a corresponding physical address in memory, the address translation table comprising a first chained table corresponding to one of the plurality of logical partitions, the first table containing a pointer to a second table corresponding to a virtual connection in the one logical partition; and
recordable signal bearing media bearing the address translation manager.

17. The program product of claim 16 wherein the second table comprises a chained table.

18. The program product of claim 16 wherein the first and second tables are located in non-contiguous portions of the memory.

19. The program product of claim 16 wherein the address translation manager creates the first and second tables in the memory.

20. The program product of claim 16 wherein the address translation manager dynamically changes the size of the address translation table.

21. The program product of claim 16 wherein the address translation table comprises:
a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory.

22. A program product comprising:
(A) an address translation manager that uses an address translation table to translate an address in one of a plurality of logical partitions to a corresponding physical address in memory, the address translation table comprising a partition connection chained table comprising a first set of tables, wherein each table in the first set of tables includes at least one pointer to a corresponding connection translation chained table, each connection translation chained table comprising a second set of tables, wherein each table in the second set of tables comprises at least one translation control entity for translating an address in one of the plurality of logical partitions to a corresponding physical address in the memory, wherein the address translation manager dynamically changes the size of the address translation table; and (B) recordable signal bearing media bearing the address translation manager.

* * * * *